No. 770,057. PATENTED SEPT. 13, 1904.
I. M. FOSTER.
CLUTCH FOR VARIABLE SPEED COUNTER SHAFTS.
APPLICATION FILED SEPT. 26, 1903.
NO MODEL.
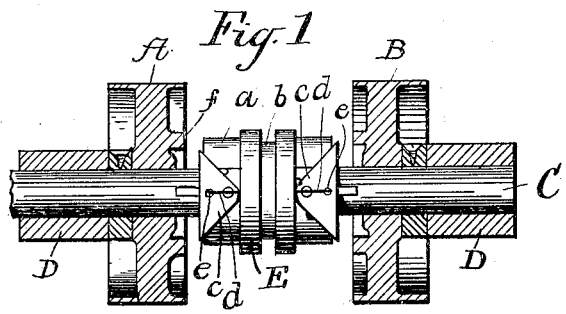
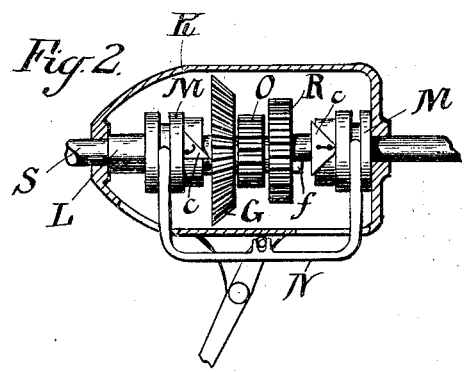
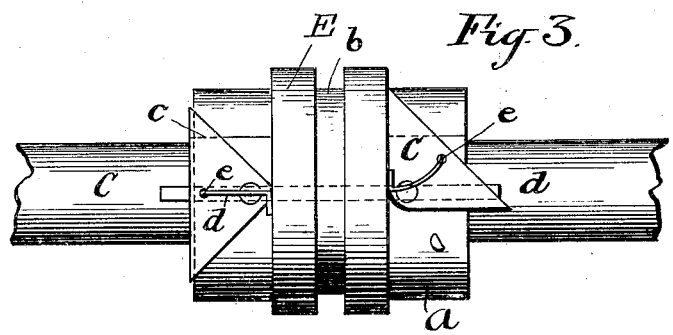
Witnesses:
John F. O'Connell
Florence M. Power
Inventor:
Isaac M. Foster
By James F. Ramsey
His Attorney No. 770,057.                                                      Patented September 13, 1904.

UNITED STATES PATENT OFFICE.

ISAAC M. FOSTER, OF WEST COVINGTON, KENTUCKY.

CLUTCH FOR VARIABLE-SPEED COUNTER-SHAFTS.

SPECIFICATION forming part of Letters Patent No. 770,057, dated September 13, 1904.

Application filed September 26, 1903. Serial No. 174,760. (No model.)

*To all whom it may concern:*

Be it known that I, ISAAC M. FOSTER, a citizen of the United States, residing at West Covington, in the county of Kenton and State of Kentucky, have invented certain new and useful Improvements in Clutches for Variable-Speed Counter-Shafts, of which the following is a full, clear, and exact description, reference being had to the accompanying drawings, forming part of this specification.

My invention relates to clutches for counter-shafts for driving machinery, such as lathes and other machinery where it is desired to drive such machinery at different speeds and either forward or backward; and it has for its object the provision of simple and efficient means whereby a greater range of speeds may be had than is possible with any counter-shaft now in use.

The novelty of my invention will be hereinafter more fully set forth, and specifically pointed out in the claims.

In the accompanying drawings, Figure 1 is a sectional plan view of my improved clutch mechanism for counter-shafts. Fig. 2 is a diminished side elevation, partly in section, and showing the clutch-shifter for back gearing. Fig. 3 is an enlarged plan view of the reversing-clutch and showing the position of the parts when one side of the clutch is in engagement to drive the counter-shaft.

The same letters of reference are used to indicate identical parts in all the figures.

In the drawings, A B represent a pair of pulleys driven from a line-shaft, (not shown,) one being driven forward and the other backward by means of a crossed belt. These pulleys are loosely mounted upon a shaft C, having its bearings in suitable brackets D.

Feathered upon the shaft C and between the pulleys A B is a clutch E, composed of a body portion $a$, having a central circumferential groove $b$ therein and carrying four pivoted triangularly-shaped members $c$, normally held, as shown in Fig. 1, by springs $d$, which are secured to the body portion $a$ of the clutch E in any suitable manner and confined at their free ends within a slotted pin $e$, as shown more clearly in Fig. 3, so as to normally hold the outer faces of said triangular members $c$ at right angles to the axis of the shaft C. The adjacent faces of the pulleys A B are provided with projections $f$, which are adapted to engage the triangular members $c$ of the clutch E when the same is in operating engagement to cause the rotation of the shaft C, as will be readily understood.

Feathered upon the sleeve L within the housing K is a pair of simultaneously-operated clutch members M, similar in construction to the clutch E already described and connected together for simultaneous operation by shifting piece N. The beveled pinion G is provided with projections $f$, similar to those upon the pulleys A B and adapted to engage the adjacent clutch M, and this pinion G is rigidly secured to the gear O, which is loosely mounted upon the sleeve L.

The operation of my device is as follows: Assuming the parts to be as shown in Fig. 1, it is only necessary to shift the clutch E in either direction in order to revolve the counter-shaft at its highest rate of speed, according to which of the two pulleys A B is engaged by the clutch, it being understood that these pulleys revolve in opposite directions, as before described, and that the direction and speed of revolution is communicated in any well-known way.

Having thus fully described my invention, I claim—

1. In a clutch for variable-speed counter-shafts and the like, the combination with a body portion, of a plurality of pivoted right-angled triangular members, and driving members adjacent to said clutch and adapted to be engaged thereby, substantially as described.

2. In a clutch for variable-speed counter-shafts and the like, the combination of a body portion, a plurality of pivoted right-angled triangular members secured thereto, stops upon said body portion to limit the movement of said right-angled triangular members, and driving members adjacent to said clutch and adapted to be engaged thereby, substantially as described.

3. In a clutch for variable-speed counter-shafts and the like, the combination with a body portion, of a plurality of pivoted triangularly-shaped members, and springs secured to said body portion and bearing against said triangularly-shaped members to hold the same normally out of engagment with the driving members, driving members adjacent to said clutch and adapted to be engaged thereby, substantially as described.

4. In a clutch for variable-speed countershafts and the like, the combination of a body portion, a plurality of pivoted triangularly-shaped members carried thereby, springs secured to said body portion and bearing against said triangularly-shaped members to hold the same normally out of engagement with the driving members, stops upon said body portion to limit the movement of said triangularly-shaped members and driving members adjacent to said clutch and adapted to be engaged thereby.

5. In a clutch for variable-speed countershafts and the like, the combination of body E, provided with circumferential groove $b$ for moving the same longitudinally along the shaft, triangularly-shaped members $c$ pivoted to said body E, and springs $d$ secured to said body E and bearing against said triangularly-shaped members $c$ to hold the same normally out of engagement with the driven members A B, and driven members A B mounted adjacent to said clutch and adapted to be engaged thereby to drive same, substantially as described.

ISAAC M. FOSTER.

Witnesses:
JAMES N. RAMSEY,
ALMA HOLLINGER.